United States Patent
Olsson (10) Patent No.: US 9,356,705 B2
(45) Date of Patent: May 31, 2016

(54) OPTICAL HOMODYNE COHERENT RECEIVER AND METHOD FOR RECEIVING A MULTICHANNEL OPTICAL SIGNAL

(75) Inventor: Bengt-Erik Olsson, Hovås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 14/365,239

(22) PCT Filed: Dec. 15, 2011

(86) PCT No.: PCT/EP2011/072872
§ 371 (c)(1),
(2), (4) Date: Jun. 13, 2014

(87) PCT Pub. No.: WO2013/087105
PCT Pub. Date: Jun. 20, 2013

(65) Prior Publication Data
US 2014/0341594 A1 Nov. 20, 2014

(51) Int. Cl.
*H04B 10/61* (2013.01)
*H04B 10/63* (2013.01)

(52) U.S. Cl.
CPC ............ *H04B 10/616* (2013.01); *H04B 10/613* (2013.01); *H04B 10/63* (2013.01)

(58) Field of Classification Search
None
See application file for complete search history.

(56) References Cited

U.S. PATENT DOCUMENTS

| | | |
|---|---|---|
| 5,146,359 A | 9/1992 | Okoshi et al. |
| 7,209,660 B1 | 4/2007 | Yee et al. |

FOREIGN PATENT DOCUMENTS

| | | | |
|---|---|---|---|
| CN | 1227444 A | 9/1999 | |
| CN | 1256813 A | 6/2000 | |
| CN | 1322408 A | 11/2001 | |
| CN | 1341297 A | 3/2002 | |
| CN | 101145849 A | 3/2008 | |
| CN | 101371479 A | 2/2009 | |
| DE | 202006007966 U1 | 8/2006 | |
| WO | WO 2012155499 A1 * | 11/2012 | ............ H04B 7/0626 |

OTHER PUBLICATIONS

Li, et al., "A novel non-uniform spacing coherent heterodyne WDM system with high channel efficiency" Journal of China Universities of Posts and Telecommunications, vol. 16(Suppl.), Sep. 1, 2009, pp. 35-39, XP026704784.

(Continued)

*Primary Examiner* — Darren E Wolf
(74) *Attorney, Agent, or Firm* — Rothwell, Figg, Ernst & Manbeck, P.C.

(57) ABSTRACT

A receiver arrangement for receiving an optical signal comprising a number of optical channels equally distributed around an optical carrier frequency. The arrangement is configured to: i) received and detect the multichannel optical signal so as to provide at least one electrical quadrature signal comprising at least one folded channel, wherein each folded channel correspond to a set of two optical channels collapsed onto each other; ii) up-convert said at least one electrical quadrature signal so as to provide at least one up-converted quadrature signal comprising at least one pair of two separated unfolded channels, wherein each pair correspond to the two optical channels of a unique folded channel; and iii) demodulating said at least one up-converted quadrature signal so as to provide one baseband quadrature signal for each un folded channel such that each baseband quadrature signal corresponds to one unique optical channel.

18 Claims, 5 Drawing Sheets

(56) References Cited

OTHER PUBLICATIONS

Liu, et al., "Multi-Carrier Coherent Receiver Based on a Shared Optical Hybrid and a Cyclic AWG Array for Terabit/s Optical Transmission", IEEE Photonics Journal. vol. 2, No. 3, Jun. 1, 2010, pp. 330-337, XP011328101.

First Office Action issued on Dec. 30, 2015 in corresponding Chinese application No. 201180075493.X, 7 pages (English translation).

* cited by examiner

OPTICAL HOMODYNE COHERENT RECEIVER AND METHOD FOR RECEIVING A MULTICHANNEL OPTICAL SIGNAL

CROSS REFERENCE TO RELATED APPLICATION(S)

This application is a 35 U.S.C. §371 National Phase Entry Application from PCT/EP2011/072872 filed Dec. 15, 2011, the disclosure of which is incorporated by reference.

TECHNICAL FIELD

This disclosure relates to optical fiber communication and particularly to a method for receiving an optical multichannel signal and a receiver for performing the method.

BACKGROUND

Today high capacity communication via optical fiber is commonly used and optical networks using optical fibers have become widespread as they are suitable for handling the rapidly growing communication of various multimedia services or similar requiring high bandwidth. On the whole it is fair to say that there is an increased interest for transporting large volumes of information with high spectral efficiency in the optical domain.

Optical transmission systems of today are therefore using advanced modulation formats, e.g. such as Quadrature Phase Shift Keying (QPSK) and 16 Quadrature Amplitude Modulation (16-QAM) and similar. Here, the information is carried in the amplitude and phase of the optical field rather than in the optical intensity as have been done before.

Normally so-called coherent receivers must be used in order to demodulate optical signals carrying information in the amplitude and phase of the optical field. In commonly known coherent receivers the incoming optical signal is mixed with the light from a Continuous Wave (CW) Local Oscillator (LO) and the electrical beat components generated upon square law photo detection in a photo detector are used as an electrical counterpart to the optical signal. However, the phase information is lost upon square law detection and there are two different ways that are typically used in order to recover both phase and amplitude of the light.

The most straight forward way to recover both phase and amplitude of the light is referred to as homodyne detection. The homodyne detection uses two parallel coherent receivers whose LO laser have 90° relative phase shift and with the LO laser frequency set to the center of the optical spectrum that is to be demodulated. The two 90° phase shifted LO laser signals must be generated from the same laser and the 90° phase shifted signals are usually generated in an optical 90° hybrid. From the two entities produced by the parallel receivers, often called in-phase signal (I) and out of phase quadrature signal (Q) components, the full phase and amplitude information can be recovered in a Digital Signal Processor (DSP).

The other way to recover both phase and amplitude of the light is usually referred to as heterodyne detection. The heterodyne detection uses one single optical LO signal placed outside the optical spectrum to be recovered and one photo detector with square law detection. In this case, the optical spectrum is converted into an Radio Frequency (RF) signal with the optical information spectrum centered at an RF frequency equal to the frequency separation between the LO and the center of the optical information spectrum. Subsequently the electrical RF signal can be down converted in the electrical domain into I and Q signals that will be equal to the I and Q signals obtained with homodyne detection described above.

Figure 1:
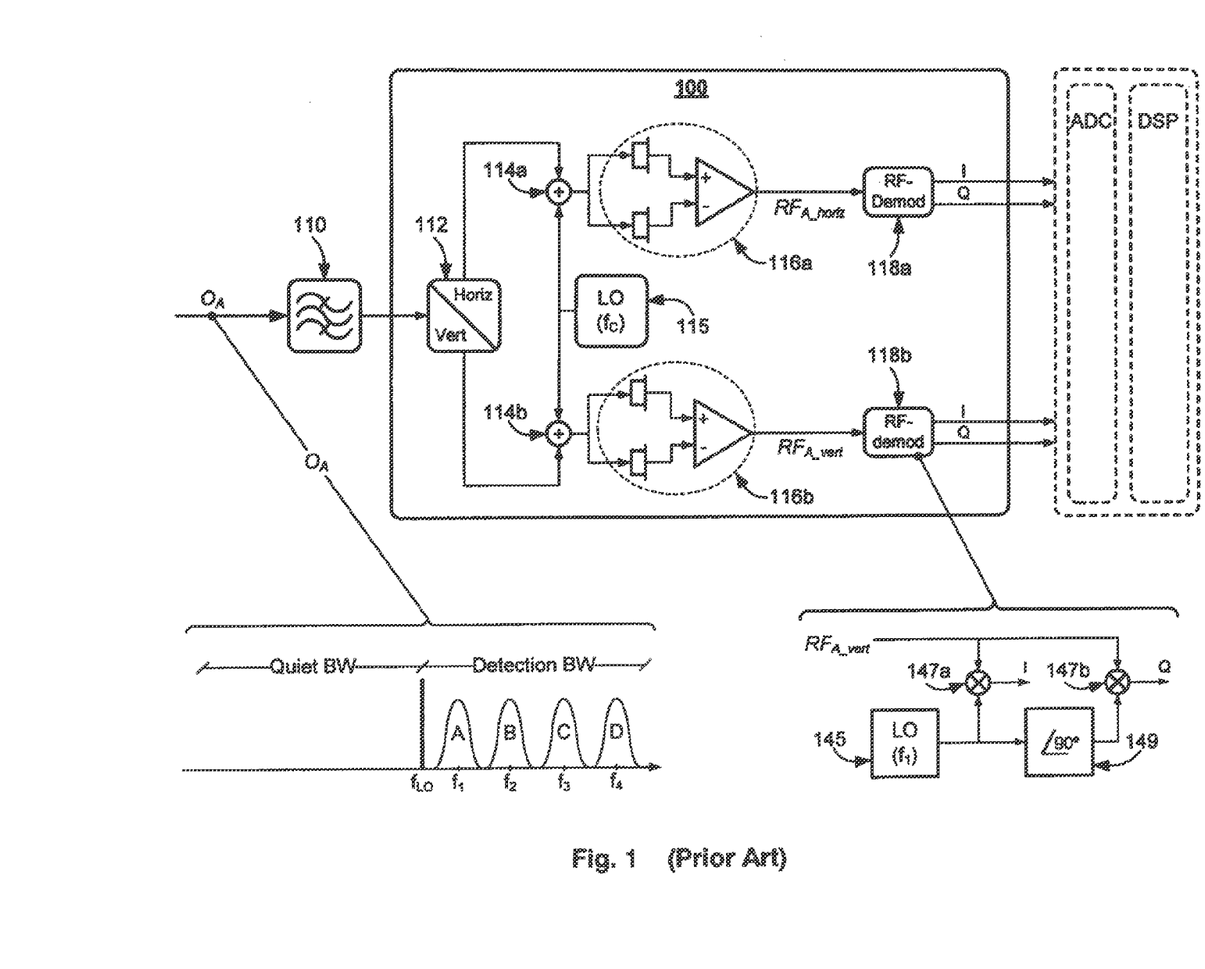
FIG. 1 is a schematic illustration of a known coherent polarization diversity heterodyne optical receiver 100.

FIG. 1 shows an implementation of a typical coherent polarization diversity heterodyne optical receiver 100. Before entering the receiver 100 it is preferred that a received optical signal $O_A$ is filtered by an optical filter 110. The received optical signal $O_A$ is then decomposed into two orthogonal optical polarizations by an optical polarization rotating arrangement 112 so as to form a first branch with a horizontally polarized signal and a second branch with a vertically polarized signal. The horizontally polarized signal in the first branch is then combined with an optical oscillator signal LO (e.g. at the frequency $f_C$) in a first combiner arrangement 114a, whereas the vertically polarized signal in the second branch is combined with the optical LO-signal in a second combiner arrangement 114b. The optical oscillator signal LO may be produced by an optical oscillator 115, e.g. a suitable laser arrangement or similar. The first combined signal in the first branch is then converted to a first electrical RF-signal $RF_{A\_horiz}$ in a first balanced optical detector 116a, whereas the second combined signal in the second branch is converted to a second electrical RF-signal $RFA\_{vert}$ in a second balanced optical detector 116b. A balanced optical detector may contain two photo diodes and a differential amplifier. The RF-signal $RF_{A\_horiz}$ and the RF-signal $RFA\_{vert}$ are electronically demodulated into base band signals I and Q before being digitized in an Analogue to Digital Converter (ADC) and processed by a Digital Signal Processor (DSP). The RF-signal $RF_{A\_horiz}$ and the RF-signal $RFA\_{vert}$ may e.g. be demodulated by a first RF-demodulator 118a and a second RF-demodulator 118b respectively.

As schematically indicated in FIG. 1, a demodulation of the RF-signal $RF_{A\_vert}$ to a baseband signal may e.g. be accomplished by mixing the RF-signal $RF_{A\_vert}$ with an electrical LO-signal of frequency $f_1$ produced by an RF oscillator 145. To this end, an in-phase component I may be obtained by using a first RF mixer 147a to mix the RF-signal $RF_{A\_vert}$ with the electrical LO-signal in-phase. A quadrature phase component Q may be obtained by using the RF oscillator 145 and a phase shifting device 149 and a second RF mixer 147b to mix the RF-signal $RF_{A\_vert}$ with the electrical LO-signal phase shifted by 90°. The same applies mutatis mutandis to a demodulation of the RF-signal $RF_{A\_horis}$ to a baseband signal. This is all well known to those skilled in the art and it needs no further description.

However, since the whole optical signal is converted onto an RF frequency, the bandwidth of the photo detector and subsequent electronics of an optical heterodyne receiver must be at least twice compared to the corresponding components in an optical homodyne receiver where the optical signal is split into two base band signals. Moreover, heterodyne detection has another important restriction in that any optical input signal must only appear on one side of the optical carrier frequency $f_{LO}$, i.e. the other side must not contain any optical energy, preferably not even optical noise, which e.g. may require thorough filtering. Moreover, in a real optical communication system many optical wavelength channels are transmitted simultaneously, so called Wavelength Division Multiplexed systems (WDM), i.e. independent optical channels are transmitted on different optical wavelengths in the same fiber. Usually, these wavelength channels have been separated by at least 50 GHz or more and optical filters are present at both transmitters and receivers in order to avoid optical energy from different wavelength channels to mix in a receiver. Recently, there is a great interest to decrease the frequency separation between optical channels and thus the optical filters should preferably be avoided. At the same time there is still an interest in supporting simultaneous reception of multiple optical channels in one coherent receiver, though it may be difficult to use a heterodyne receiver for the reasons now mentioned.

Figure 2:
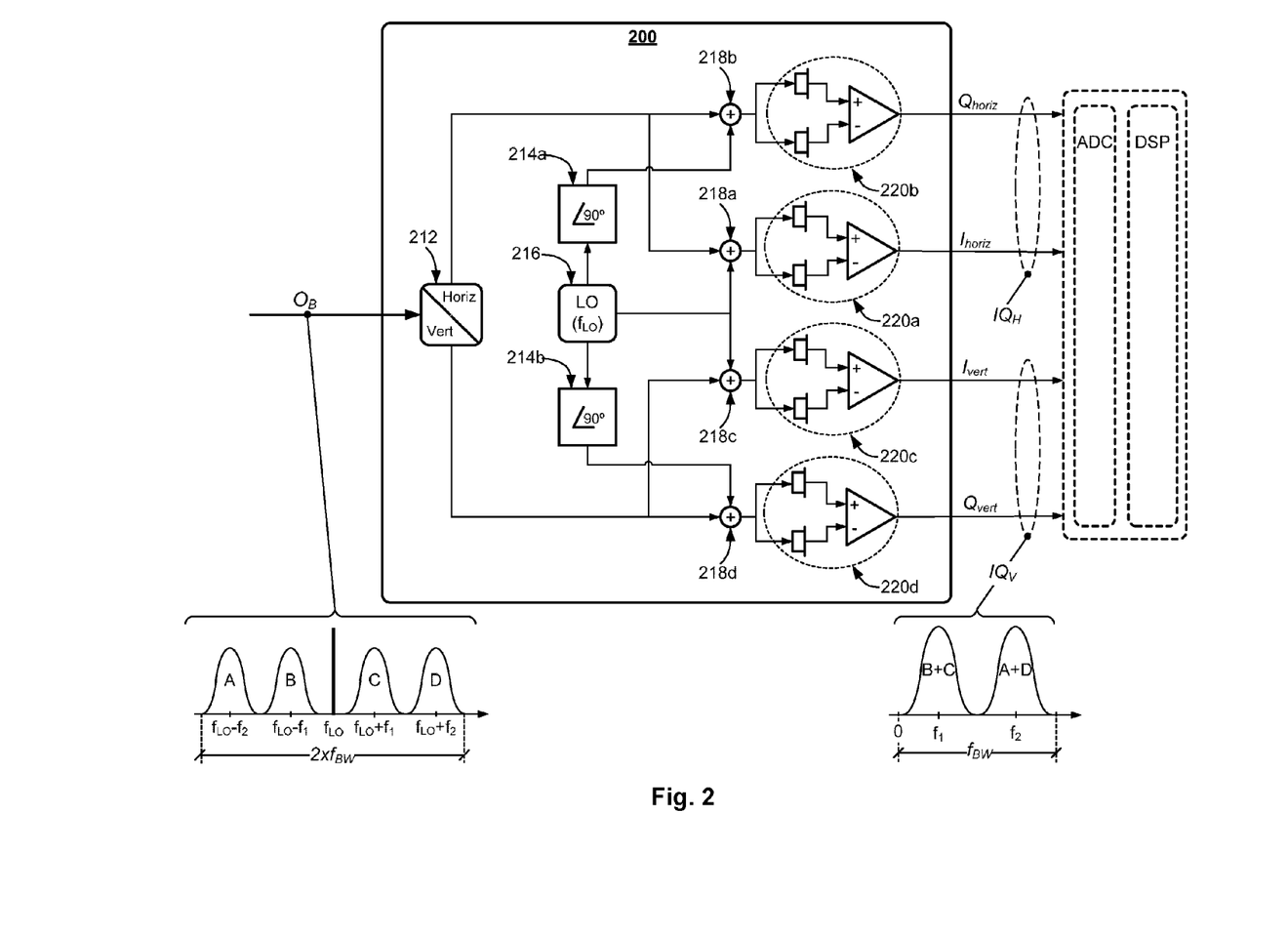
FIG. 2 is a schematic illustration of a coherent polarization diversity optical homodyne receiver 200.

Thus a coherent homodyne optical receiver may be preferred for receiving an optical multichannel signal. FIG. 2 is a schematic illustration of a coherent polarization diversity optical homodyne receiver 200, which will be discussed in more detail later.

However, conventional optical homodyne receivers can not detect multiple channels unless these are recovered in a Digital Signal Processor (DSP). Here the optical spectral information is converted into the I and Q electrical signals and thus one single DSP must handle the complete receiver bandwidth. In the DSP the I and Q signals are treated as real and imaginary part of a complex number and there the complete spectrum can be obtained using negative frequencies. However, in analog electronics only real signals can be manipulated and thus the complete optical spectrum is not trivially recovered.

SUMMARY

At least some of the drawbacks indicated above have been eliminated or mitigated by an embodiment of the present solution providing a method for receiving a multichannel optical signal in an optical homodyne receiver arrangement. The optical signal comprises a number of optical channels equally distributed around an optical carrier frequency. The optical receiver arrangement comprises an optical homodyne receiver and a multichannel recovery unit. The method comprises the actions of: receiving and detecting the multichannel optical signal so as to provide at least one electrical quadrature signal comprising at least one folded channel, wherein each folded channel correspond to a set of two optical channels collapsed onto each other; and up converting said at least one electrical quadrature signal so as to provide at least one up converted quadrature signal comprising at least one pair of two separated unfolded channels, wherein each pair correspond to the two optical channels of an unique folded channel; and demodulating said at least one up converted quadrature signal so as to provide one baseband quadrature signal for each unfolded channel such that each baseband quadrature signal corresponds to one unique optical channel.

At least some of the drawbacks indicated above have also been eliminated or mitigated by another embodiment of the present solution providing an optical homodyne receiver arrangement configured to operatively receive a multichannel optical signal comprising a number of optical channels equally distributed around an optical carrier frequency, wherein: an optical homodyne receiver is configured to operatively receive and detect the multichannel optical signal so as to provide at least one electrical quadrature signal comprising at least one folded channel, wherein each folded channel correspond to a set of two optical channels collapsed onto each other; and an up converter arrangement is configured to operatively up convert said at least one electrical quadrature signal so as to provide at least one up converted quadrature signal comprising at least one pair of two separated unfolded channels, wherein each pair correspond to the two optical channels of an unique folded channel; and an down converter arrangement is configured to operatively demodulate said at least one up converted quadrature signal so as to provide one baseband quadrature signal for each un folded channel such that each baseband quadrature signal corresponds to one unique optical channel.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the methods defined in the specification or the appended claims may comprise further steps in addition to those mentioned. In addition, the steps mentioned may, without departing from the present solution, be performed in other sequences than those given in the specification or the claims.

Further advantages of the present invention and embodiments thereof will appear from the following detailed description of the solution.

DETAILED DESCRIPTION OF EMBODIMENTS

FIG. 2 shows an exemplifying optical homodyne receiver 200 according to an embodiment of the present solution receiving an exemplifying multichannel optical signal $O_B$. It is preferred that the optical receiver 200 is a coherent receiver. It is preferred that the optical receiver 200 is a polarization diversity receiver.

As can be seen in FIG. 2, the exemplifying received optical signal $O_B$ comprises a main optical carrier signal at a frequency fLO and a number of optical channels (e.g. first optical channel A, second optical channel B, third optical channel C, fourth optical channel D) each comprising a set of information carried by an optical subcarrier e.g. $f_{LO}-f_2$, $f_{LO}-f_1$, $f_{LO}+f_1$, $f_{LO}+f_2$ respectively. Preferably, each subcarrier has been modulated by a signal comprising the set of information in question. The modulating signal may e.g. be an electrical RF-signal. As is well known to those skilled in the art, the multichannel optical signal $O_B$ may e.g. be produced by means of one or several optical Mach Zehnder modulators or similar.

The set of information comprised by an optical channel A, B, C, D may be any set of information that can be converted into a form that is suitable for transmission in an optical channel, e.g. transmitted through an optic fiber or similar. The set of information may e.g. be the information in a data file, in an image, in a video, in a piece of music, in a speech, in a text or similar, or the information in any other item that can be provided to and/or from a suitable communication resource via an optical fiber or similar.

It may be noted that the receiver 200 does not need any optical filter corresponding to the optical filter 110 of the receiver 100 in FIG. 1. On the contrary, the received optical signal $O_B$ may, without such filtering, be decomposed into two orthogonal optical polarizations by an optical polarization rotating arrangement 212 so as to form a first branch with a first polarized signal at a first polarization and a second branch with a second polarized signal at a second polarization. The optical polarization rotating arrangement 212 may be any known optical polarization rotating arrangement capable of polarizing the optical $O_B$ as indicated herein. It is preferred that the first polarized signal has an orthogonal polarization with respect to the second polarized signal. For example, the first polarized signal may be a horizontally polarized signal and the second polarized signal may be a vertically polarized signal. The first polarized signal and the second polarized signal is the same as the received optical signal $O_B$, however with a polarization as now indicated.

The first polarized signal in the first branch is combined with an optical oscillator signal LO (at the frequency $f_{down}$) in a first combiner arrangement 218a so as to produce a first down converted optical signal. The first down converted optical signal is then converted to a first electrical in-phase signal $I_{horiz}$ in a first balanced optical detector 220a. It is preferred that the optical detector 220a is an optical square law detector or similar. The oscillator signal LO may be generated by means of any suitable optical oscillator device 216, e.g. a light emitting laser arrangement tuned at the appropriate frequency.

The first polarized signal in the first branch is also combined with a phase-shifted version of the optical oscillator signal LO in a second combiner arrangement 218b so as to produce a second down converted optical signal. The second down converted optical signal is converted to a first electrical quadrature phase signal $Q_{horiz}$ in a second balanced optical detector 220b, preferably in the form of an optical square law detector or similar. Preferably, the optical oscillator signal LO is phase-shifted in a first optical phase shifting arrangement 214a. It is preferred that the first optical phase-shifting arrangement 214a phase shifts the optical oscillator signal LO such that the phase-shifted optical oscillator signal is orthogonal with respect to the un-shifted the optical oscillator signal LO, e.g. such as the optical oscillator signal LO is phase shifted by 90° with respect to the un-shifted the optical oscillator signal LO. The first optical phase shifting arrangement 214a may be any known phase shifting arrangement capable of phase shifting the optical oscillator signal LO as indicated herein.

The second polarized signal in the second branch is combined with the optical oscillator signal LO in a third combiner arrangement 218c so as to produce a third down converted optical signal. The third down converted optical signal is converted to an electrical second in-phase signal $I_{vert}$ in a third balanced optical detector 220c, preferably in the form of an optical square law detector or similar.

The second polarized signal in the second branch is also combined with a phase-shifted version of the optical oscillator signal LO in a fourth combiner arrangement 218d so as to produce a second down converted optical signal. The second down converted optical signal is converted to an electrical second quadrature phase signal $Q_{vert}$ in a fourth balanced optical detector 220d, preferably in the form of an optical square law detector or similar. Here, it is preferred that the optical oscillator signal LO is phase-shifted in a second optical phase shifting arrangement 214b. It is preferred that the second phase-shifting arrangement 214b is of the same or similar kind as the first optical phase-shifting arrangement 214a.

As can be seen in FIG. 2, the multichannel optical signal $O_B$ has now been detected such that a first electrical quadrature signal $IQ_H$ and a second electrical quadrature signal $IQ_V$ has been produced. The first quadrature signal $IQ_H$ mentioned above correspond to the first polarized signal (e.g. being horizontally polarized), and the second quadrature signal $IQ_V$ mentioned above correspond to the second polarized signal (e.g. being vertically polarized). Thus, the exemplifying receiver 200 is a polarization diversity receiver, i.a. providing a first quadrature signal $IQ_H$ corresponding to a first polarized signal and a second quadrature signal $IQ_V$ correspond to second polarized signal.

Those skilled in the art is well aware of the fact that a quadrature signal is a signal that comprises an in-phase component and a quadrature phase component of an originating signal, e.g. in the same manner as first electrical quadrature phase signal $IQ_H$ comprises the in-phase signal $I_{horiz}$ and the quadrature phase signal $Q_{horiz}$ of the down converted first polarized signal mentioned above, whereas the second quadrature signal $IQ_V$ comprises the in-phase signal $I_{vert}$ and the quadrature signal $Q_{vert}$ of the down converted second polarized signal mentioned above.

As schematically indicated in FIG. 2, the electrical quadrature signal $IQ_V$ comprises one or more folded channels, e.g. a first folded channel A+D and a second folded channel B+C. The first folded channel A+D corresponds to the two optical channels A and D collapsed onto each other at upper side of the optical carrier signal $f_{LO}$. The second folded channel B+C corresponds to the two optical channels B and C collapsed onto each other at same upper side of the optical carrier signal $f_{LO}$. It preferred that first folded channel A+D forms a single first electrical channel centered on a first frequency $f_1$. It is preferred that the first folded channel A+D comprises information corresponding to the information in the two optical channels A and D. Similarly, it is preferred that second folded channel B+C forms a single second electrical channel centered on a second frequency $f_2$. It is preferred that the second folded channel B+C comprises information corresponding to the information in the two optical channels B and C. It is preferred that the first folded frequency $f_1$ is lower than the second folded frequency $f_2$.

To summarize the above, the electrical quadrature signal $IQ_V$ comprises one or more folded channels, where each folded channel corresponds to two optical channels fully or at least partly collapsed onto each other at the upper side of the optical carrier signal of $f_{LO}$ of the multichannel optical signal $O_B$ and where each folded channel forms a single electrical channel centered on a separate folding frequency.

The exemplifying basic features of the optical homodyne receiver 200 discussed above and variants thereof are well known to those skilled in the art and these features need no further description as such. However, it may be added that the in-phase signals $I_{horiz}$, $I_{vert}$ and the orthogonal quadrature phase signals $Q_{horiz}$, $Q_{vert}$ are normally digitized in an Analogue to Digital Converter (ADC) and processed by a single Digital Signal Processor (DSP) as indicated by dashed lines in FIG. 2. Indeed, it should be noted that conventional homodyne receivers can not detect multiple channels unless the channels are recovered in a single DSP. Since the full optical spectral information has to be recovered—i.e. the full spectrum of the folded channels A+D and B+C—the single DSP must handle the complete receiver bandwidth $f_{BW}$, i.e. the detection bandwidth $f_{BW}$ required by the photo detectors 220a, 220b, 220c, 220d for detecting the received optical signal $O_B$ (note the folding phenomena caused by the photo detectors as illustrated in FIG. 2).

Before we proceed it should be clarified that the discussion below is only directed to the second electrical quadrature signal $IQ_V$, while the first electrical quadrature signal $IQ_H$ is neglected for the reasons of simplicity and readability. Thus the discussion below only elaborates on the one polarization represented by the second quadrature signal $IQ_V$. However, the discussion is equally applicable to the first quadrature signal $IQ_H$ representing the other polarization. Indeed, a skilled person having the benefit of this disclosure realizes that a complete polarization receiver may be accomplished by additionally providing the first quadrature signal $IQ_H$ to a duplicate of the up-converter arrangement 310 and the down-converter arrangement 320, or a duplicate of the up-converter arrangement 410 and the down-converter arrangement 420 that will be discussed below with reference to FIGS. 2, 3 and 4.

Figure 3:
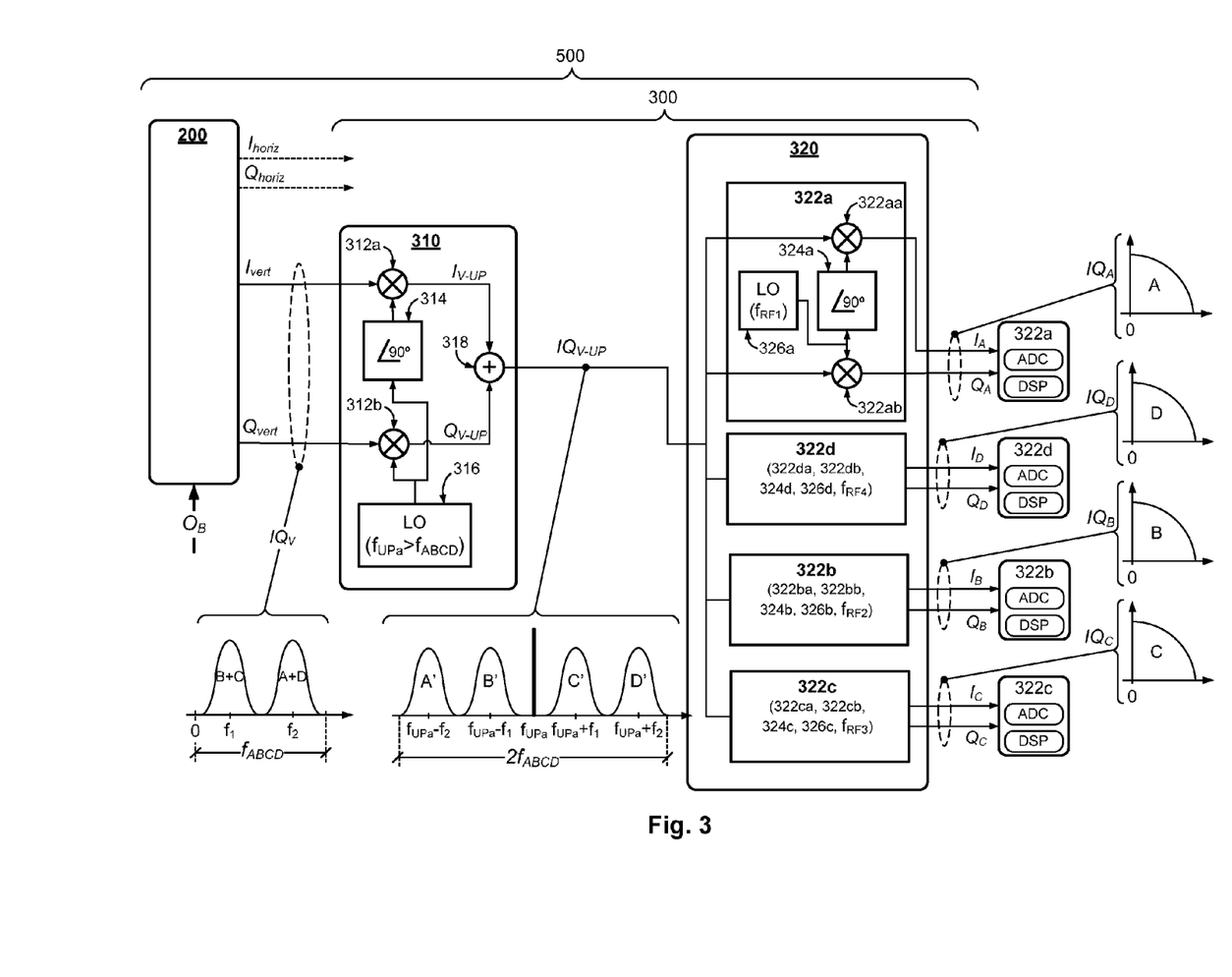
FIG. 3 is a schematic illustration a multichannel optical homodyne receiver arrangement 500 comprising the receiver 200 provided with a multichannel recover unit 300 according to an embodiment of the present solution.

The attention is now directed to FIG. 3 showing a schematic illustration of an optical homodyne receiver arrangement 500 according to an embodiment of the present solution. It is preferred that the optical receiver arrangement 500 is a coherent receiver arrangement. It is preferred that the optical receiver arrangement 500 is a polarization diversity receiver arrangement. The optical receiver arrangement 500 comprises the optical homodyne receiver 200 discussed above or similar connected to a multichannel recover unit 300 according to an embodiment of the present solution.

The multichannel recover unit 300 comprises an up-converter arrangement 310 and a down-converter arrangement 320.

The up-converter arrangement 310 is preferably configured to operatively up-convert the electrical quadrature signal $IQ_V$ so as to provide at least one up-converted quadrature signal $IQ_{V\text{-}UP}$ comprising a number of unfolded channels e.g. a first unfolded channel A', a second unfolded channel B', a third unfolded channel C', a fourth unfolded channel D'—corresponding to the number of optical channels in the optical multichannel signal $O_B$—e.g. the first optical channel A, the second optical channel B, the third optical channel C, the fourth optical channel D respectively. It is preferred that up-converted quadrature signal $IQ_{V\text{-}UP}$ comprises a main electrical carrier signal at a RF carrier frequency $f_{UPa}$ carrying the unfolded channels A', B', C', D' each comprising a set of information carried by an optical subcarrier $f_{UPa}-f_2$, $f_{UPa}-f_1$, $f_{UPa}+f_1$, $f_{UPa}+f_2$ respectively. Each subcarrier may be regarded as being modulated by a signal comprising the set of information in question.

To summarize, the unfolded channels correspond to the optical channels in the received multichannel optical signal $O_B$ when distributed (preferably equally distributed) around the main optical carrier frequency $f_{LO}$ of the received multichannel optical signal $O_B$. The unfolded channels may e.g. be separated by guard bands or similar. Each guard band or similar may have a predetermined bandwidth. The unfolded channels are preferably equally distributed around the electrical carrier frequency $f_{UPa}$ of the up-converted signal $IQ_{V\text{-}UP}$, preferably in the same or similar manner as the corresponding optical channels are equally distributed around the optical carrier frequency $f_{LO}$ of the optical signal $O_B$.

It is preferred that the RF carrier frequency $f_{UPa}$ is modulated with the electrical quadrature signal $IQ_v$ so as to provide the up-converted quadrature signal $IQ_{V\text{-}UP}$ comprising a first set of unfolded channels A' and D' equally distributed around the RF carrier frequency $f_{UPb}$, and a second set of unfolded channels B' and C' equally distributed around the RF carrier frequency $f_{UPa}$. Here, it is preferred that the RF carrier frequency $f_{UPa}$ is above the bandwidth $f_{ABCD}$ occupied by the two folded channels A+D and B+C, i.e. here it is preferred that $f_{UPa} > f_{ABCD}$. Here the bandwidth $f_{ABCD}$ may correspond to the bandwidth $f_{BW}$ required by the photo detectors 220a, 220b, 220c, 220d.

To be able to perform the actions indicated above it is preferred that the up-converter arrangement 310 comprises a number of features. Thus, it is preferred that the exemplifying up-converter arrangement 310 comprises a first up-converter mixer 312a, a second up-converter mixer 312b, a phase shifting arrangement 314, an oscillator arrangement 316 and a summation arrangement 318.

The first up-converter mixer 312a is preferably configured to mix the in-phase signal $I_{vert}$ of the electrical quadrature signal $IQ_V$ with the RF carrier frequency $f_{UPa}$ phase shifted by 90° or similar so as to produce a first up-converted signal $I_{V\text{-}UP}$. It is preferred that the carrier frequency $f_{UPa}$ is phase shifted by means of an electrical phase shifting arrangement 314.

The second up-converter mixer 312b is preferably configured to mix the quadrature phase signal $Q_{vert}$ of the electrical quadrature signal $IQ_V$ with the same RF carrier frequency $f_{UPa}$ without any phase shift so as to produce a second up-converted signal $Q_{V\text{-}UP}$.

Note that the opposite may be applied in other embodiments, i.e. the in-phase signal $I_{vert}$ is mixed with the RF carrier frequency $f_{UPa}$ without any phase shift and the quadrature phase signal $Q_{vert}$ is mixed with the RF carrier frequency $f_{UPa}$ phase shifted by 90° or similar. This is generally applicable to the embodiments discussed herein.

The electrical phase shifting arrangement 314 may be any known phase shifting arrangement capable of phase shifting the electrical carrier frequency $f_{UPa}$ by 90° or similar. For example, the phase shifting arrangement 314 may be a simple delay circuit configured to delay the carrier frequency $f_{UP}$ by an amount of time corresponding to a phase shift of 90°.

The oscillator arrangement 316 generating the carrier frequency $f_{UPa}$ may be any suitable known electrical oscillator arrangement capable of generating the carrier frequency $f_{UPa}$. The oscillator arrangement 316 may e.g. be based on a Voltage Controlled Oscillator (VCO) or similar configured to generate the carrier frequency $f_{UPa}$.

The summation arrangement 318 is preferably configured to operatively summarize the first up-converted signal $I_{V\text{-}UP}$ and the second up-converted signal $I_{Q\text{-}UP}$ so as to produce the up-converted quadrature signal $IQ_{V\text{-}UP}$ mentioned above comprising a number of unfolded channels. The summation arrangement 318 may be any suitable known summation arrangement capable of adding the first up-converted signal $I_{V\text{-}UP}$ and the second up-converted signal $I_{Q\text{-}UP}$ so as to produce the up-converted quadrature signal $IQ_{V\text{-}UP}$.

The attention is now directed to the down-converter arrangement 320 of the multichannel recovery unit 300 in FIG. 3. The down-converter arrangement 320 is preferably configured to operatively demodulate the up-converted quadrature signal $IQ_{V\text{-}UP}$ so as to provide one baseband quadrature signal for each unfolded channel such that each base band channel corresponds to one unfolded channel, e.g. so as to provide a first baseband quadrature signal $IQ_A$, a second baseband quadrature signal $IQ_B$, a third baseband quadrature signal $IQ_C$ and a fourth baseband quadrature signal $IQ_D$ corresponding to the first unfolded channel A', the second unfolded channel C', the third unfolded channel C' and the fourth unfolded channel D' respectively. It is preferred that the first baseband quadrature signal $IQ_A$ comprises the same set of information as the first unfolded channel A', and that the second baseband quadrature signal $IQ_B$ comprises the same set of information as the second unfolded channel B', and that the third baseband quadrature signal $IQ_C$ comprises the same set of information as the third unfolded channel C' and that the fourth baseband quadrature signal $IQ_D$ comprises the same set of information as the fourth unfolded channel D'. It is preferred that each baseband quadrature signal $IQ_A$, $IQ_B$, $IQ_C$ and $IQ_D$ is centered around a frequency $f_A$, $f_B$, $f_C$ and $f_D$ respectively.

To be able to perform the actions indicated above it is preferred that the down-converter arrangement 320 comprises a number of features. Thus, it is preferred that the exemplifying down-converter arrangement 320 comprises a first down converter unit 322a, a second down converter unit 322b, a third down converter unit 322c and a fourth down converter unit 322d.

It is preferred that each down converter unit 322a, 322b, 322c, 322d comprises a first down-converter mixer, a second down-converter mixer, a phase shifting arrangement and an oscillator arrangement.

Thus, it is preferred that the first down converter unit 322a comprises a first down-converter mixer 322aa, a second down-converter mixer 322ab, a phase shifting arrangement 324a and an oscillator arrangement 326a producing a first RF-carrier frequency $f_{RF1}$.

Similarly, it is preferred that the second down converter unit 322b comprises a first down-converter mixer 322ba, a second down-converter mixer 322bb, a phase shifting arrangement 324b and an oscillator arrangement 326b producing a second RF-carrier frequency $f_{RF2}$.

Similarly, it is preferred that the third down converter unit 322c comprises a first down-converter mixer 322ca, a second down-converter mixer 322cb, a phase shifting arrangement 324c and an oscillator arrangement 326c producing a third RF-carrier frequency $f_{RF3}$.

Similarly, it is preferred that the fourth down converter unit 322d comprises a first down-converter mixer 322da, a second down-converter mixer 322db, a phase shifting arrangement 324d and an oscillator arrangement 326d producing a fourth RF-carrier frequency $f_{RF4}$.

The first down-converter mixer, the second down-converter mixer, the phase shifting arrangement and the oscillator arrangement of the down converter units 322a, 322b, 322c, 322d are described below with reference to the first down converter unit 322a producing the first baseband signal $IQ_A$. However, the same applies mutatis mutandis for the other down converter units 322b, 322c and 322d producing the second baseband signal $IQ_B$, the third baseband signal $IQ_C$ and the fourth baseband signal $IQ_D$ respectively.

The first down-converter mixer 322aa is preferably configured to mix the up-converted quadrature signal $IQ_{V-UP}$ with a RF carrier frequency $f_{RF1}$ phase shifted by 90° or similar so as to produce an in-phase signal $I_A$ of the first baseband signal $IQ_A$. It is preferred that the RF carrier frequency $f_{RF1}$ is phase shifted by means of an electrical phase shifting arrangement 324.

The second down-converter mixer 322ab is preferably configured to mix the up-converted quadrature signal $IQ_{V-UP}$ with the RF carrier frequency $f_{RF1}$ without any phase shift so as to produce an in-quadrature signal $Q_A$ of the first baseband signal $IQ_A$.

The electrical phase shifting arrangement 324 may be any known phase shifting arrangement capable of phase shifting the electrical carrier frequency $f_{RF1}$ by 90° or similar. For example, the phase shifting arrangement 314 may be a simple delay circuit configured to delay the carrier frequency $f_{RF1}$ by an amount of time corresponding to a phase shift of 90°.

The electrical oscillator arrangement 326 may be any suitable known electrical oscillator arrangement capable of generating the carrier frequency $f_{RF1}$. The oscillator arrangement 326 may e.g. be based on a Voltage Controlled Oscillator (VCO) or similar configured to generate the carrier frequency $f_{RF1}$.

It should be noted that each baseband quadrature signal of the multi channel recovery unit 300 can be handled separately, e.g. separated for further signal processing and/or amplification and transmission via an antenna or similar. For example, each baseband quadrature signal of the multi channel recovery unit 300 may be provided to an individual set of an Analogue to Digital Converter (ADC) and a Digital Signal Processor (DSP) for further processing, e.g. such that the base band signals $IQ_A$, $IQ_B$, $IQ_C$ and $IQ_D$ is provided to provided to a first individual DSP arrangement 322a, a second individual DSP arrangement 322b, a third individual DSP arrangement 322c and a fourth individual DSP arrangement 322d respectively as indicated in FIG. 3. This is in clear contrast to the known optical homodyne receiver 200 described above with reference to FIG. 2 wherein the resulting base band signal $IQ_V$ comprising all the folded channels A+D and B+C is provided to a single set of an ADC and a DSP.

An advantage of providing each baseband quadrature signal of the multi channel recovery unit 300 to an individual set of an ADC and a DSP is that the operational bandwidth of each individual DSP in the multichannel optical homodyne receiver arrangement 500 in FIG. 3 can be significantly reduced compared to the single DSP used in the conventional optical homodyne receiver 200 in FIG. 2, wherein the DSP requires an operational bandwidth corresponding the complete receiver bandwidth $f_{BW}$, i.e. the detection bandwidth $f_{BW}$ required by the photo detectors 220a, 220b, 220c, 220d.

Before proceeding it should be mentioned that the up-converter arrangement 310 and the down-converter arrangement 320 of the multichannel recover unit 300 may be fully or partly analogue and/or fully or partly digital.
Hit, 2011-12-14

Figure 4:
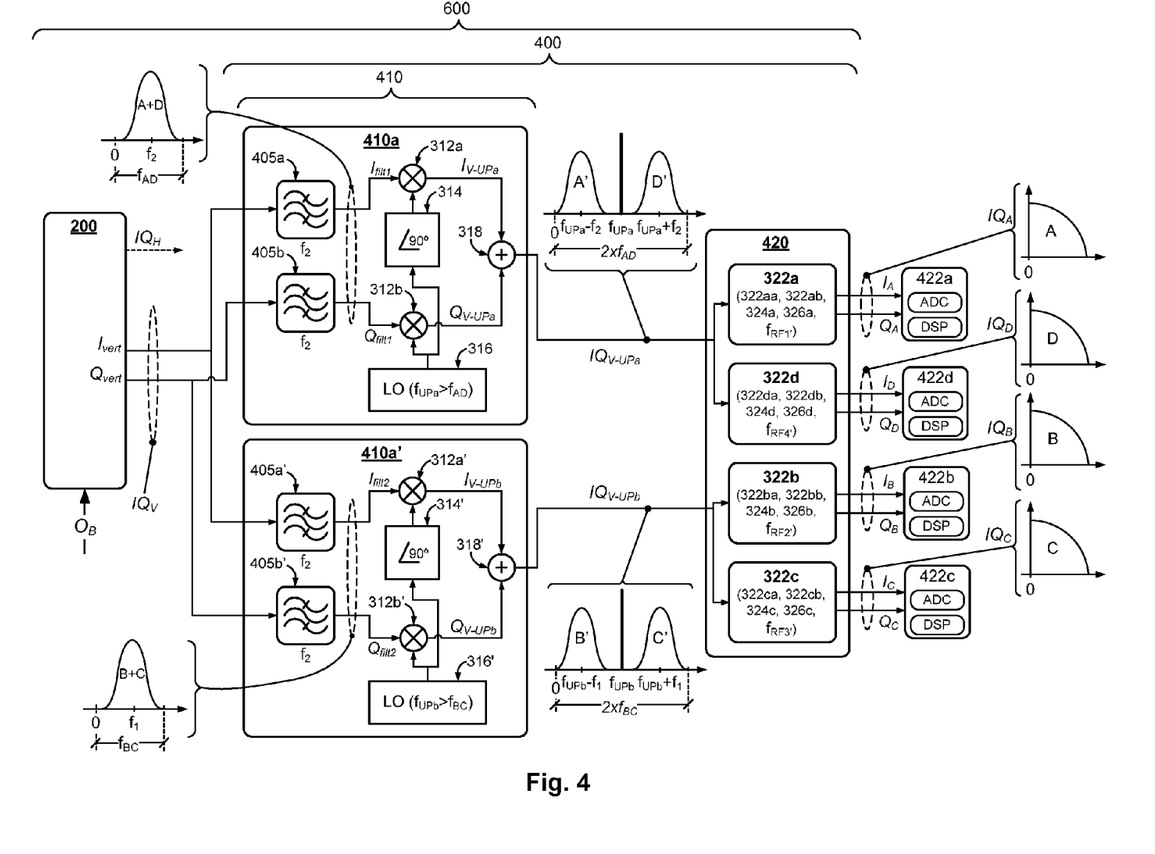
FIG. 4 is a schematic illustration a multichannel optical homodyne receiver arrangement 600 comprising the receiver 200 provided with a multichannel recover unit 400 according to another embodiment of the present solution.
Figure 5:
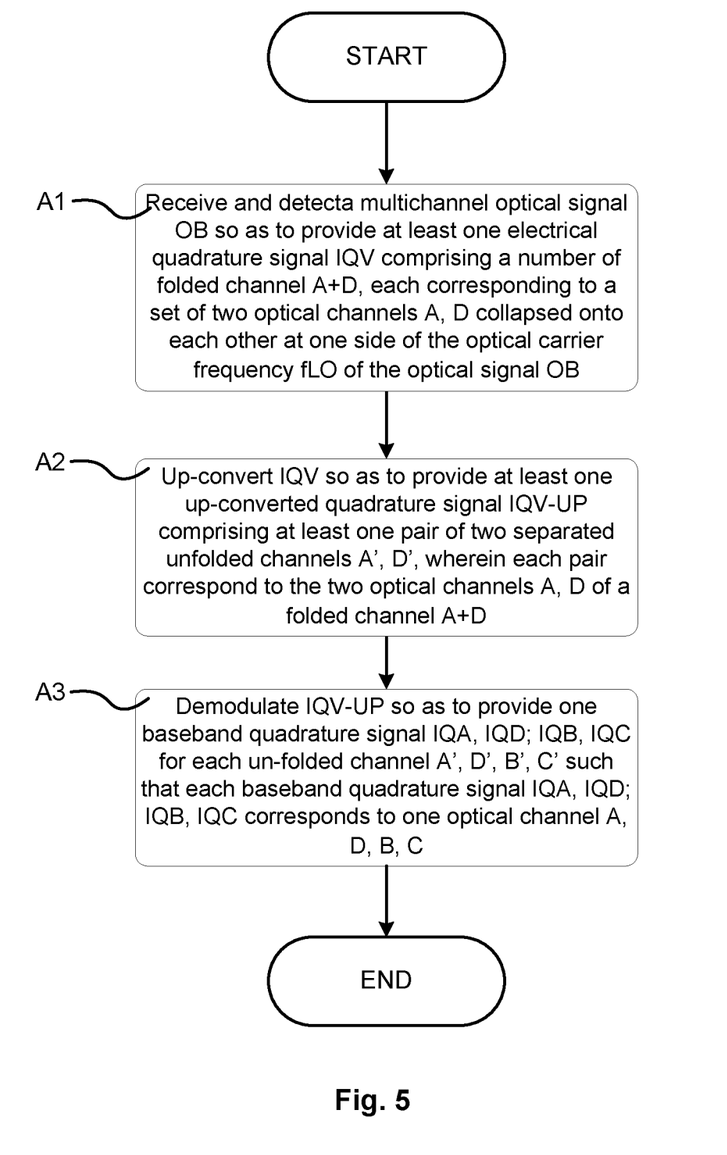
FIG. 5 is a schematic flowchart which illustrates the operation of exemplifying embodiments of the present solution.

The attention is now directed to FIG. 4 showing a schematic illustration of an optical homodyne receiver arrangement 600 according to another embodiment of the present solution. It is preferred that the optical receiver arrangement 600 is a coherent receiver arrangement. It is preferred that the optical receiver arrangement 600 is a polarization diversity receiver arrangement. The optical receiver arrangement 600 comprises the homodyne receiver 200 discussed above or similar now connected to a multichannel recover unit 400 according to an embodiment of the present solution.

The multichannel recover unit 400 comprises an up-converter arrangement 410 and a down-converter arrangement 420.

The up-converter arrangement 410 is preferably configured to operatively up-convert the electrical quadrature signal $IQ_V$ so as to provide a first up-converted quadrature signal $IQ_{V-UPa}$ comprising a first number of unfolded channels, e.g. a first set of at least two unfolded channels—e.g. A' and D'—corresponding to a first number of optical channels in the multichannel optical signal $O_B$—e.g. A and D respectively.

In addition, the up-converter arrangement 410 is preferably configured to operatively up-convert the electrical quadrature signal $IQ_V$ so as to provide a second up-converted quadrature signal $IQ_{V-UPb}$ comprising a second number of unfolded channels, e.g. a second set of at least two unfolded channels—e.g. B' and C'—corresponding to a second number of optical channels in the received multichannel optical signal $O_B$—e.g. B and C respectively.

It is preferred that the electrical quadrature signal $IQ_V$ is up-converted by modulating the first carrier frequency $f_{UPa}$ with the quadrature signal $IQ_V$ so as to provide the first up-converted quadrature signal $IQ_{V-UPa}$ comprising the first number of unfolded channels—e.g. A' and D'—equally distributed around the first electrical carrier frequency $f_{UPa}$. It is also preferred that the electrical quadrature signal $IQ_V$ is up-converted by modulating a second electrical carrier frequency $f_{UPb}$ with the quadrature signal $IQ_V$ so as to provide the second up-converted quadrature signal $IQ_{V-UPb}$ comprising the second number of unfolded channels—e.g. B' and C'—equally distributed around the second carrier $f_{UPb}$. Here, it is preferred that the RF carrier frequency $f_{UPa}$ and the RF carrier frequency $f_{UPb}$ are above the bandwidth $f_{AD}$ and $f_{BC}$ occupied by a single folded channel A+D or B+C respectively, i.e. here it is preferred that $f_{UPa} > f_{AD}$ and $f_{UPb} > f_{BC}$. Note that the bandwidth $f_{AD}$ and $f_{BC}$ may each correspond to half the bandwidth $f_{BW}/2$ required by the photo detectors 220a, 220b, 220c, 220d.

It is preferred that the first up-converted quadrature signal $IQ_{V-UPa}$ comprises a main carrier signal at the RF carrier frequency $f_{UPa}$ carrying the unfolded channels A' and D' each comprising a set of information carried by an optical subcarrier $f_{UPa}-f_2$, $f_{UPa}+f_2$ respectively, wherein each subcarrier can be regarded as being modulated by a signal comprising the set of information in question.

Similarly, it is preferred that the second up-converted quadrature signal $IQ_{V-UPb}$ comprises a main carrier signal at the RF carrier frequency $f_{UPb}$ carrying the unfolded channels B' and C' each comprising a set of information carried by an optical subcarrier $f_{UPb}-f_1$, $f_{UPb}+f_1$ respectively, wherein each subcarrier can be regarded as being modulated by a signal comprising the set of information in question.

To be able to perform the actions indicated above it is preferred that the exemplifying up-converter arrangement 410 in FIG. 4 comprises a first up converter unit 410a and a second up converter unit 410b.

The exemplifying first up converter unit 410a is configured to up-convert the quadrature signal $IQ_V$ by modulating the first carrier frequency $f_{UPa}$ with the quadrature signal $IQ_V$ so as to provide the first up-converted quadrature signal $IQ_{V-UPa}$ comprising the first number of unfolded channels equally distributed around the first carrier frequency $f_{UPa}$, e.g. a first set of the two unfolded channels A' and D' equally distributed around the first carrier frequency $f_{UPa}$.

To accomplish the up-converting actions mention above it is preferred that the exemplifying first up converter unit 410a comprises a first frequency filter 405a, a second frequency filter 405b, a first up-converter mixer 312a, a second up-converter mixer 312b, a first phase shifting arrangement 314, a first oscillator arrangement 316 and a first summation arrangement 318. It is preferred that the structure and function of the features 312a, 312b, 314, 316 and 318 is the same or similar as the structure of the corresponding features with the same reference number described above when discussing the up-converter arrangement 310 in FIG. 3.

However, the first frequency filter 405a and the second frequency filter 405b are not present in the up-converter arrangement 310 in FIG. 3.

The first frequency filter 405a is configured to operatively filter the in-phase signal $I_{vert}$ of the quadrature signal $IQ_V$ so as to produce a first filtered in-phase signal $I_{filt1}$ comprising the first folded channel A+D, i.e. the second folded channel B+C has been filtered away. The first filtered in-phase signal $I_{filt1}$ is provided to the first up-converter mixer 312a for further processing as described above with reference to the up-converter mixer 312a of the up-converter arrangement 310 in FIG. 3. In other words, the first filtered in-phase signal $I_{filt1}$ is preferably mixed with the RF carrier frequency $f_{UPa}$ being phase shifted by 90° or similar so as to produce a first up-converted in-phase signal $I_{V-UPa}$. The first frequency filter 405a may any suitable filter (e.g. a band-pass filter) configured to filter out the frequency band comprising the first folded channel A+D.

The second frequency filter 405b is configured to operatively filter the quadrature phase signal $Q_{vert}$ of the quadrature signal $IQ_V$ so as to produce a first filtered quadrature phase signal $Q_{filt1}$ also comprising the first folded channel A+D, i.e. the second folded channel B+C has been filtered away. The first filtered quadrature phase signal $Q_{filt1}$ is provided to the second up-converter mixer 312b for further processing as described above with reference to the up-converter mixer 312b of the up-converter arrangement 310 in FIG. 3. In other words, the first filtered quadrature phase signal $Q_{filt1}$ is preferably mixed with the RF carrier frequency $f_{UPa}$ without any phase shift so as to produce a first up-converted quadrature phase signal $Q_{V-UPa}$. The second frequency filter 405b may any suitable filter (e.g. a band-pass filter) configured to filter out the frequency band comprising the first folded channel A+D.

As can be seen in FIG. 4 it is preferred that the first summation arrangement 318 is configured to operatively summarize the first up-converted in-phase signal $I_{V-UPa}$ and the first up-converted quadrature phase signal $Q_{V-UPa}$ so as to provide the first up-converted quadrature signal $IQ_{V-UPa}$. This is preferably accomplished in the same or similar manner as described above with reference to the summation arrangement 318 of the up-converter arrangement 310 in FIG. 3.

The attention is now turned to the exemplifying second up converter unit 410b in FIG. 4. The second up converter unit 410b is configured to up-convert the quadrature signal $IQ_V$ by modulating the second carrier frequency $f_{UPb}$ with the quadrature signal $IQ_V$ so as to provide the second up-converted quadrature signal $IQ_{V-UPb}$ comprising the second number of unfolded channels equally distributed around the second carrier frequency $f_{UPb}$, e.g. a second set of the two unfolded channels B' and C' equally distributed around the first carrier frequency $f_{UPb}$.

The first carrier frequency $f_{UPa}$ used in the first up converter unit 410a and the second carrier frequency $f_{UPb}$ used in the second up converter 410b may be the same frequency or they may be two different frequencies.

To accomplish the up-converting actions mention above it is preferred that the second up converter unit 410b comprises a third frequency filter 405a', a fourth frequency filter 405b', a third up-converter mixer 312a', a fourth up-converter mixer 312b', a second phase shifting arrangement 314', a second oscillator arrangement 316' and a second summation arrangement 318'. It is preferred that the structure and function of the features 312a', 312b', 314', 316' and 318' is the same or similar as described above with reference to the features 312a, 312b, 314, 316 and 318 respectively of the first up-converter arrangement 410a.

However, the third frequency filter 405a' and the fourth frequency filter 405b' are not present in the up-converter arrangement 310 in FIG. 3.

The third frequency filter 405a' is configured to operatively filter the in-phase signal $I_{vert}$ of the quadrature signal $IQ_V$ so as to produce a second filtered in-phase signal $I_{filt2}$ comprising the second folded channel B+C, i.e. the first folded channel A+D has been filtered away. The second filtered in-phase signal $I_{filt2}$ is provided to the third up-converter mixer 312a' for further processing as described above with reference to the up-converter mixer 312a of the up-converter arrangement 310 in FIG. 3. In other words, the second filtered in-phase signal $I_{filt2}$ is preferably mixed with the RF carrier frequency $f_{UPb}$ phase shifted by 90° or similar so as to produce a second up-converted in-phase signal $I_{V-UPb}$. The third frequency filter 405a' may be any suitable filter (e.g. a band-pass filter) configured to filter out the frequency band comprising the second folded channel B+C.

The fourth frequency filter 405b is configured to operatively filter the quadrature phase signal $Q_{vert}$ of the quadrature signal $IQ_V$ so as to produce a second filtered quadrature phase signal $Q_{filt2}$ comprising the second folded channel B+C, i.e. the first folded channel A+D has been filtered away. The second filtered quadrature phase signal $Q_{filt2}$ is provided to the fourth up-converter mixer 312b' for further processing as described above with reference to the up-converter mixer 312b of the up-converter arrangement 310 in FIG. 3. In other words, the second filtered quadrature phase signal $Q_{filt2}$ is preferably mixed with the RF carrier frequency $f_{UPb}$ without any phase shift so as to produce a second up-converted quadrature phase signal $Q_{V\_UPb}$. The fourth frequency filter 405b' may be any suitable filter (e.g. a band-pass filter) configured to filter out the frequency band comprising the second folded channel A+D.

As can be seen in FIG. 4 it is preferred that the second summation arrangement 318' is configured to operatively summarize the second up-converted in-phase signal $I_{V\_UPb}$ and the second up-converted quadrature phase signal $Q_{V\_UPb}$ so as to provide the second up-converted quadrature signal $IQ_{V\_UPb}$. This is preferably accomplished in the same or similar manner as described above with reference to the summation arrangement 318 of the up-converter arrangement 310 in FIG. 3.

The attention is now directed to the down-converter arrangement 420 of the multichannel recovery unit 400 in FIG. 4. The down-converter arrangement 420 is preferably configured to operatively demodulate the first up-converted quadrature signal $IQ_{V\_UPa}$ so as to provide one baseband quadrature signal for each unfolded channel therein such that each base band channel corresponds to one unfolded channel, e.g. so as to provide a first baseband quadrature signal $IQ_A$ and a fourth baseband quadrature signal $IQ_D$ corresponding to the first unfolded channel A' and the fourth unfolded channel D' respectively. Similarly, it is also preferred that the down-converter arrangement 420 is configured to operatively demodulate the second up-converted quadrature signal $IQ_{V\_UPb}$ so as to provide one baseband quadrature signal for each unfolded channel therein such that each base band channel corresponds to one unfolded channel, e.g. so as to provide a second baseband quadrature signal $IQ_B$ and a third baseband quadrature signal $IQ_C$ corresponding to the second unfolded channel B' and the third unfolded channel C' respectively.

To be able to perform the actions indicated above it is preferred that the down-converter arrangement 420 comprises a first down converter unit 322a, a second down converter unit 322b, a third down converter unit 322c and a fourth down converter unit 322d. It is preferred that the down converter units 322a, 322b, 322c, 322d of the down-converter arrangement 420 is the same or similar as the down converter units 322a, 322b, 322c, 322d of the down-converter arrangement 320 in FIG. 3. However, down converter units 322a, 322b, 322c, 322d of the down-converter arrangement 420 may use other suitable RF carrier frequencies $f_{RF1'}$, $f_{RF2'}$, $f_{RF3'}$ and $f_{RF4'}$ instead of the RF carrier frequencies $f_{RF1}$, $f_{RF2}$, $f_{RF3}$ and $f_{RF4}$ respectively used in the down-converter arrangement 320 to produce the baseband quadrature signals $IQ_A$, $IQ_D$, $IQ_B$, $IQ_C$.

It should be noted that each baseband quadrature signal of the multi channel recovery unit 400 can be handled separately, e.g. separated for further signal processing and/or amplification and transmission via an antenna or similar. For example, each baseband quadrature signal of the multi channel recovery unit 400 may be provided to an individual set of an Analogue to Digital Converter (ADC) and a Digital Signal Processor (DSP) for further processing, e.g. such that the base band signals $IQ_A$, $IQ_B$, $IQ_C$ and $IQ_D$ is provided to a first individual DSP arrangement 422a, a second individual DSP arrangement 422b, a third individual DSP arrangement 422c and a fourth individual DSP arrangement 422d respectively as indicated in FIG. 4. This is in clear contrast to the known optical homodyne receiver 200 described above with reference to FIG. 3 wherein the resulting base band signal $IQ_V$ comprising all the folded channels A+D and B+C is provided to a single set of an ADC and a DSP.

An advantage of providing each baseband quadrature signal of the multi channel recovery unit 400 to an individual set of an ADC and a DSP is that the operation bandwidth of each individual DSP in the multichannel optical homodyne receiver arrangement 600 in FIG. 4 can be significantly reduced compared to the single DSP used in the conventional optical homodyne receiver 200 in FIG. 2, wherein the DSP requires an operational bandwidth corresponding the complete receiver bandwidth $f_{BW}$, i.e. the detection bandwidth $f_{BW}$ required by the photo detectors 220a, 220b, 220c, 220d.

It should be mentioned that the up-converter arrangement 410 and the down-converter arrangement 420 of the multichannel recover unit 400 may be fully or partly analogue and/or fully or partly digital.

The embodiments discussed above may be summarized in the following manner:

One embodiment may be directed to a method for receiving a multichannel optical signal in an optical receiver arrangement. The optical signal comprises a number of optical channels equally distributed around an optical carrier frequency. The optical receiver arrangement comprises an optical homodyne receiver and a multichannel recovery unit.

The method comprises the actions of:
receiving and detecting the multichannel optical signal so as to provide at least one electrical quadrature signal comprising at least one folded channel, wherein each folded channel correspond to a set of two optical channels collapsed onto each other;
up converting said at least one electrical quadrature signal so as to provide at least one up converted quadrature signal comprising at least one pair of two separated unfolded channels, wherein each pair correspond to the two optical channels of an unique folded channel; and
demodulating said at least one up converted quadrature signal so as to provide one baseband quadrature signal for each un folded channel such that each baseband quadrature signal corresponds to one unique optical channel.

At least a first carrier frequency may be modulated with the electrical quadrature signal so as to provide said at least one up converted quadrature signal such that the unfolded channels in each pair of separated unfolded channels are equally distributed around said at least first carrier frequency.

It is preferred that the first carrier frequency is at least above the bandwidth of an individual unfolded channel.

In the method the up converting may comprise the actions of up converting the electrical quadrature signal so as to provide:
at least a first up converted quadrature signal comprising a first set of pairs of separated unfolded channels, wherein each pair correspond to the two optical channels of an unique folded channel,
at least a second up converted quadrature signal comprising a second set of pairs of separated unfolded channels, wherein each pair correspond to the two optical channels of an unique folded channel.

In the method the up converting may comprise the actions of:
modulating a first carrier frequency with the electrical quadrature signal so as to provide said at least first up converted quadrature signal such that the unfolded channels in each pair of separated unfolded channels are equally distributed around the first carrier frequency, and
modulating a second carrier frequency with the electrical quadrature signal so as to provide said at least second up converted quadrature signal such that the unfolded channels in each pair of separated unfolded channels are equally distributed around the second carrier frequency.

It is preferred that the first carrier frequency and the second carrier frequency are at least above half the bandwidth of an individual unfolded channel.

In the method the demodulating may comprise the actions of:
mixing said at least one up converted quadrature signal with one RF carrier frequency for each un folded channel so as to provide said baseband quadrature signals.

In the method the demodulating may comprise the actions of:
mixing said at least first up converted quadrature signal with one RF carrier frequency for each un folded channel therein so as to provide a second part of said baseband quadrature signals, and
mixing said at least second up converted quadrature signal with one RF carrier frequency for each un folded channel therein so as to provide a second part of said baseband quadrature signals.

Still another embodiment of the present solution may be directed to an optical homodyne receiver arrangement configured to operatively receive a multichannel optical signal comprising a number of optical channels equally distributed around an optical carrier frequency wherein:
an optical homodyne receiver is configured to operatively receive and detect the multichannel optical signal so as to provide at least one electrical quadrature signal comprising at least one folded channel, wherein each folded channel correspond to a set of two optical channels collapsed onto each other,
an up converter arrangement is configured to operatively up convert said at least one electrical quadrature signal so as to provide at least one up converted quadrature signal comprising at least one pair of two separated unfolded channels, wherein each pair correspond to the two optical channels of an unique folded channel, and
an down converter arrangement is configured to operatively demodulate said at least one up converted quadrature signal so as to provide one baseband quadrature signal for each un folded channel such that each baseband quadrature signal corresponds to one unique optical channel.

The up converter arrangement may be configured to operatively up convert said at least one electrical quadrature signal by modulating at least a first carrier frequency with the electrical quadrature signal so as to provide said at least one up converted quadrature signal such that the unfolded channels in each pair of separated unfolded channels are equally distributed around said at least first carrier frequency.

The up converter arrangement may be configured to operatively up convert said at least one electrical quadrature signal so as to provide:
at least a first up converted quadrature signal comprising a first set of pairs of separated unfolded channels, wherein each pair correspond to the two optical channels of an unique folded channel,
at least a second up converted quadrature signal comprising a second set of pairs of separated unfolded channels, wherein each pair correspond to the two optical channels of an unique folded channel.

The up converter arrangement may be configured to operatively up convert said at least one electrical quadrature signal by:
modulating a first carrier frequency with the electrical quadrature signal so as to provide said at least first up converted quadrature signal such that the unfolded channels in each pair of separated unfolded channels are equally distributed around the first carrier frequency, and
modulating a second carrier frequency with the electrical quadrature signal so as to provide said at least second up converted quadrature signal such that the unfolded channels in each pair of separated unfolded channels are equally distributed around the second carrier frequency.

The down converter arrangement may be configured to operatively demodulate said at least one up converted quadrature signal by mixing said at least one up converted quadrature signal with one RF carrier frequency for each un folded channel so as to provide said baseband quadrature signals.

The down converter arrangement may be configured to operatively demodulate said at least one up converted quadrature signal by:
mixing said at least first up converted quadrature signal with one RF carrier frequency for each un folded channel therein so as to provide a second part of said baseband quadrature signals, and
mixing said at least second up converted quadrature signal with one RF carrier frequency for each un folded channel therein so as to provide a second part of said baseband quadrature signals.

The present invention has now been described with reference to exemplifying embodiments. However, the invention is not limited to the embodiments described herein. On the contrary, the full extent of the invention is only determined by the scope of the appended claims.

The invention claimed is:

1. A method for receiving a multichannel optical signal in an optical receiver, wherein the optical signal comprises a set of optical channels equally distributed around an optical carrier frequency and the optical receiver comprises an optical homodyne receiver and a multichannel recovery unit, said set of optical channels comprising a first optical channel and a second optical channel, the method comprising:
receiving and detecting the multichannel optical signal so as to provide a first electrical quadrature signal comprising a first folded channel, said first folded channel corresponding to the first optical channel collapsed onto the second optical channel;
up-converting said first electrical quadrature signal so as to provide a first up-converted quadrature signal comprising a first unfolded channel corresponding to the first optical channel and a second unfolded channel corresponding to the second optical channel; and
demodulating said first up-converted quadrature signal so as to provide a first baseband quadrature signal corresponding to the first optical channel and a second baseband quadrature signal corresponding to the second optical channel.

2. The method of claim 1, wherein the up-converting comprises:
modulating a first carrier frequency with the first electrical quadrature signal so as to provide said first up-converted quadrature signal such that the first and second unfolded channels are equally distributed around said first carrier frequency.

3. The method of claim 2, wherein the first carrier frequency is greater than the highest frequency of the bandwidth of the first unfolded channel.

4. The method of claim 1, wherein
said set of optical channels further comprises a third optical channel and a fourth optical channel, and
the step of up-converting comprises up-converting the first electrical quadrature signal so as to provide:
said first up-converted quadrature signal, and
a second up-converted quadrature signal comprising a third unfolded channel corresponding to the third optical channel and a fourth unfolded channel corresponding to the fourth optical channel.

5. The method of claim 4, wherein the up-converting comprises:
modulating a first carrier frequency with the first electrical quadrature signal so as to provide said first up-converted quadrature signal such that the first and second unfolded channels are equally distributed around the first carrier frequency, and
modulating a second carrier frequency with the first electrical quadrature signal so as to provide said second up-converted quadrature signal such that the third and fourth unfolded channels are equally distributed around the second carrier frequency.

6. The method of claim 5, wherein the first carrier frequency is greater than the highest frequency of the bandwidth of the first unfolded channel.

7. The method of claim 1, wherein the demodulating comprises:
mixing said first up-converted quadrature signal with a first RF carrier frequency so as to provide said first baseband quadrature signal; and
mixing said first up-converted quadrature signal with a second RF carrier frequency so as to provide said second baseband quadrature signal.

8. The method of claim 4, wherein the demodulating comprises:
mixing said first up-converted quadrature signal with a first RF carrier frequency to produce an in-quadrature signal of said first baseband quadrature signal, and
mixing said second up-converted quadrature signal with a second RF carrier frequency to produce an in-quadrature signal of said third baseband quadrature signal.

9. An optical homodyne receiver apparatus configured to operatively receive a multichannel optical signal comprising a set of optical channels equally distributed around an optical carrier frequency, said set of optical channels comprising a first optical channel and a second optical channel, comprising:
an optical homodyne receiver configured to operatively receive and detect the multichannel optical signal so as to provide a first electrical quadrature comprising a first folded channel, said first folded channel corresponding to the first optical channel collapsed onto the second optical channel;
an up-converter configured to operatively up-convert said first electrical quadrature signal so as to provide a first up-converted quadrature signal comprising a first unfolded channel corresponding to the first optical channel and a second unfolded channel corresponding to the second optical channel; and
a down converter configured to operatively demodulate said first up-converted quadrature signal so as to provide a first baseband quadrature signal corresponding to the first optical channel and a second baseband quadrature signal corresponding to the second optical channel.

10. The optical homodyne receiver apparatus of claim 9, wherein the up-converter is configured to operatively up-convert said first electrical quadrature signal by modulating a first carrier frequency with the first electrical quadrature signal so as to provide said first up-converted quadrature signal such that the first and second unfolded channels are equally distributed around said first carrier frequency.

11. The optical homodyne receiver apparatus of claim 9, wherein
the set of optical channels further comprises a third optical channel and a fourth optical channel, and
the up-converter is configured to operatively up-convert said first electrical quadrature signal so as to provide:
said first up-converted quadrature signal, and
a second up-converted quadrature signal comprising a third unfolded channel corresponding to the third optical channel and a fourth unfolded channel corresponding to the fourth optical channel.

12. The optical homodyne receiver apparatus of claim 11, wherein the up-converter is configured to operatively up-convert said at least one electrical quadrature signal by:
modulating a first carrier frequency with the first electrical quadrature signal so as to provide said first up-converted quadrature signal such that the first and second unfolded channels are equally distributed around the first carrier frequency, and
modulating a second carrier frequency with the first electrical quadrature signal so as to provide said second up-converted quadrature signal such that the third and fourth unfolded channels are equally distributed around the second carrier frequency.

13. The optical homodyne receiver apparatus of claim 9, wherein the down converter is configured to operatively demodulate said first up-converted quadrature signal by mixing said first up-converted quadrature signal with a first RF carrier frequency so as to provide said first baseband quadrature signal.

14. The optical homodyne receiver apparatus of claim 12, wherein the down converter is configured to operatively demodulate said first up-converted quadrature signal by:
mixing said first up-converted quadrature signal with a first RF carrier frequency to produce an in-quadrature signal of said first baseband quadrature signal, and
mixing said second up-converted quadrature signal with a second RF carrier frequency to produce an in-quadrature signal of said third baseband quadrature signal.

15. The method of claim 1, wherein
the set of optical channels further comprises a third optical channel and a fourth optical channel, and
said first electrical quadrature signal further comprises a second folded channel, said second folded channel corresponding to the third optical channel collapsed onto the fourth optical channel.

16. The method of claim 15, wherein said first up-converted quadrature signal further comprises a third unfolded channel corresponding to the third optical channel and a fourth unfolded channel corresponding to the fourth optical channel.

17. The optical homodyne receiver apparatus of claim 9, wherein the set of optical channels further comprises a third optical channel and a fourth optical channel, and said first electrical quadrature signal further comprises a second folded channel, said second folded channel corresponding to the third optical channel collapsed onto the fourth optical channel.

18. The optical homodyne receiver apparatus of claim 17, wherein said first up-converted quadrature signal further comprises a third unfolded channel corresponding to the third optical channel and a fourth unfolded channel corresponding to the fourth optical channel.

* * * * *